(12) United States Patent
Zhong et al.

(10) Patent No.: US 10,154,299 B2
(45) Date of Patent: Dec. 11, 2018

(54) SPLIT-TYPE TELEVISION

(71) Applicant: AMLOGIC (SHANGHAI) CO., LTD., Shanghai (CN)

(72) Inventors: John Zhong, Shanghai (CN); Mike Yip, Shanghai (CN); Kevin Chen, Shanghai (CN); Robin Zhu, Shanghai (CN)

(73) Assignee: AMLOGIC (SHANGHAI) CO., LTD. (CN)

( * ) Notice: Subject to any disclaimer, the term of this patent is extended or adjusted under 35 U.S.C. 154(b) by 0 days.

(21) Appl. No.: 15/321,038

(22) PCT Filed: Oct. 27, 2015

(86) PCT No.: PCT/CN2015/092889
§ 371 (c)(1),
(2) Date: Dec. 21, 2016

(87) PCT Pub. No.: WO2016/070732
PCT Pub. Date: May 12, 2016

(65) Prior Publication Data
US 2017/0201706 A1    Jul. 13, 2017

Related U.S. Application Data

(60) Provisional application No. 62/077,236, filed on Nov. 8, 2014.

(30) Foreign Application Priority Data

Mar. 25, 2015    (CN) .......................... 2015 1 0134239

(51) Int. Cl.
*H04N 21/40*    (2011.01)
*H04N 21/41*    (2011.01)
(Continued)

(52) U.S. Cl.
CPC ..... *H04N 21/4122* (2013.01); *G06F 13/4081* (2013.01); *H01R 24/64* (2013.01);
(Continued)

(58) Field of Classification Search
None
See application file for complete search history.

(56) References Cited

U.S. PATENT DOCUMENTS 8,450,880 B2 * 5/2013 Narita ...................... H04N 5/63
307/116
9,736,436 B2 * 8/2017 Beals ..................... H04H 20/63
(Continued)

FOREIGN PATENT DOCUMENTS

CN    1697496    * 11/2005
CN    1697496 A    11/2005
(Continued)

*Primary Examiner* — Ricky Chin
(74) *Attorney, Agent, or Firm* — Levenfeld Pearlstein, LLC

(57) ABSTRACT

Split-type televisions provided in this invention relate to the field of television, and separately configures the master control module and the display in the television, the display is mainly used to play the audio and video data, and the master control module is mainly used to receive and process the audio and video data; the master control module and the display are separately configured in the physical structure, thus it allows users to carry out the operations like repairing, maintenance, upgrading and replacement on them separately; at the same time, since the display (the screen terminal) is provided with the power adapter for the master control module, and as long as the master control module is connected to the display, the power adapter will be able to supply power to the master control module, thus achieving the master control module and the display configured separately share the same power source.

9 Claims, 3 Drawing Sheets

(51) Int. Cl.
*H04N 5/64* (2006.01)
*H04N 5/44* (2011.01)
*H04N 5/46* (2006.01)
*H04N 5/60* (2006.01)
*H04N 5/63* (2006.01)
*H04N 7/01* (2006.01)
*G06F 13/40* (2006.01)
*H04N 5/38* (2006.01)
*H04N 21/61* (2011.01)
*H01R 24/64* (2011.01)
*H01R 27/02* (2006.01)
*H04N 21/426* (2011.01)
*H04N 21/4363* (2011.01)
*H01R 107/00* (2006.01)

(52) U.S. Cl.
CPC ............... *H01R 27/02* (2013.01); *H04N 5/38* (2013.01); *H04N 5/4401* (2013.01); *H04N 5/4403* (2013.01); *H04N 5/46* (2013.01); *H04N 5/60* (2013.01); *H04N 5/63* (2013.01); *H04N 5/64* (2013.01); *H04N 7/01* (2013.01); *H04N 7/0125* (2013.01); *H04N 21/41* (2013.01); *H04N 21/4104* (2013.01); *H04N 21/426* (2013.01); *H04N 21/43635* (2013.01); *H04N 21/6125* (2013.01); *H01R 2107/00* (2013.01); *H01R 2201/18* (2013.01); *H04N 2005/4412* (2013.01); *H04N 2005/4414* (2013.01)

(56) References Cited

U.S. PATENT DOCUMENTS

| | | | | |
|---|---|---|---|---|
| 2003/0093512 A1* | 5/2003 | Seo | ................... | H04N 21/2368 709/223 |
| 2005/0166241 A1* | 7/2005 | Kim | ................... | H04N 5/44513 725/81 |
| 2007/0199042 A1* | 8/2007 | Yip | ................... | H04H 20/04 725/135 |
| 2008/0120667 A1* | 5/2008 | Zaltsman | ............ | H04L 12/2856 725/110 |
| 2009/0077271 A1* | 3/2009 | Kaag | ................... | H04N 5/445 710/10 |
| 2010/0169940 A1* | 7/2010 | Howarter | ................... | H04B 3/54 725/80 |
| 2011/0212777 A1* | 9/2011 | Chen | ................... | A63F 13/235 463/32 |
| 2011/0216245 A1* | 9/2011 | Kyriazis | ................... | H04N 5/38 348/723 |
| 2012/0014049 A1* | 1/2012 | Ogle | ................... | H05K 5/0278 361/679.01 |
| 2013/0111533 A1* | 5/2013 | Klarke | ................... | H04N 21/6125 725/109 |
| 2013/0263108 A1* | 10/2013 | Chung | ................... | G06F 8/65 717/170 |
| 2013/0283331 A1* | 10/2013 | Kim | ................... | H04N 21/2385 725/116 |
| 2013/0332967 A1* | 12/2013 | Chang | ................... | H04H 40/90 725/68 |
| 2014/0049693 A1* | 2/2014 | Selim | ................... | G06F 3/017 348/570 |
| 2014/0133827 A1* | 5/2014 | Etoh | ................... | H04N 21/4122 386/230 |
| 2014/0157334 A1* | 6/2014 | Cavgalar | ................... | H04N 21/4135 725/82 |
| 2014/0359663 A1* | 12/2014 | Nakanishi | ........ | H04N 21/4858 725/37 |
| 2015/0062426 A1* | 3/2015 | Lu | ................... | H04N 5/775 348/441 |
| 2017/0201706 A1* | 7/2017 | Zhong | ................... | H04N 5/64 |
| 2017/0244925 A1* | 8/2017 | Zhong | ................... | H04N 5/64 |
| 2017/0244929 A1* | 8/2017 | Zhong | ................... | H04N 5/64 |
| 2017/0264850 A1* | 9/2017 | Zhong | ................... | H04N 5/64 |

FOREIGN PATENT DOCUMENTS

| | | |
|---|---|---|
| CN | 104767949 A | 7/2015 |
| CN | 104767951 A | 7/2015 |
| KR | 20060112531 A | 11/2006 |

* cited by examiner

SPLIT-TYPE TELEVISION

CROSS-REFERENCE TO RELATED APPLICATIONS

The present application claims priority to and the benefit of Chinese Patent Application No. CN 201510134239.2, filed on Mar. 25, 2015, and of U.S. Provisional Patent Application No. 62/007,236, filed on Nov. 8, 2014, the entire content of which is incorporated herein by reference.

BACKGROUND OF THE INVENTION

1. Field of the Invention

The invention relates to the field of television, and more particularly, to a split-type television.

2. Description of the Related Art

In the process of the development of modern society, as an important medium for people to obtain audio and video information, the television has been constantly developed with advances in technology, especially with the ever-changing internet technology; the smart television obtains more and more people's attention as the core device of smart home.

At present, televisions are all-in-one machines in the market, which is that devices like the screen terminal for display and the main module for control are integrated as a whole for design, production and sale; the service life of the television is long (at least 4 to 5 years, or even 10 years), yet with the advances of technology, the main module is updated faster and the screen terminal device is updated slower, which results mismatch between the devices of the television as an all-in-one machine; so users can only purchase the whole machine when upgrading, thereby it greatly increases the upgrading cost, and hinders the upgrading process of the core module of televisions.

In addition, with the advances in technology, functions realized and integrated in televisions are more and more, which shows a diversified development trend; manufacturers integrate many functional modules in televisions to meet different users' demands as much as possible; however with the diversified development of society, individuation of user demands is growing, thereby causes televisions produced by manufacturers cannot meet the different demands of different users, and makes the television purchased by users attached many useless functions as for itself, thereby results in a waste of resources.

SUMMARY OF THE INVENTION

In view of the above-mentioned technical issues, the present invention provides a split-type television, comprising:

a master control module, connected to a signal transmission device of the split-type television to receive first data transmitted by the signal transmission device, and, after processing the first data, converting the processed first data into second data;

at least one connector; and a display, connected to the master control module through at least one of the connectors, and configured to receive the second data, and play audio and video signals contained in the second data;

wherein the master control module and the display are configured separately, and the display is provided with a power adapter, and the power adapter drives the master control module through the connectors.

As a preferable embodiment, in the split-type television, the audio and video signal comprises audio data and/or video data, the display comprises:

a bridge chip, receiving the second data and, after processing the second data, outputting the audio data and/or the video data for playing.

As a preferable embodiment, in the split-type television, the display further comprises:

a display device, connected to the bridge chip to receive and play the video data.

As a preferable embodiment, in the split-type television, the display further comprises:

an audio device, connected to the bridge chip to receive and play the audio data.

As a preferable embodiment, in the split-type television, the display further comprises:

a plurality of peripheral devices, all connected to the bridge chip to adjust operating parameters of the audio device and the display device, and receive remote-control signal transmitted by a remote control matching with the split-type television.

As a preferable embodiment, in the split-type television, the peripheral devices comprise:

a physical button, connected to the bridge chip to adjust the operating parameters of the audio device and the display device;

a remote-control signal receiving device, connected to the bridge chip to receive the remote-control signals, to control the playing of the audio data and/or the video data.

As a preferable embodiment, in the split-type television, the master control module comprises:

at least one subunit, and each of the subunits being connected to the matching signal transmission device;

a core unit, and each of the subunits being connected to the display through the core unit;

wherein any one of the subunits receives the first data from the matching signal transmission device, and converts the first data into unprocessed data in a standard format to the core unit, and the core unit processes and converts the unprocessed data in a standard format into the second data.

As a preferable embodiment, in the split-type television, the subunits comprise:

a wireless television signal processing subunit, configured to receive and process wireless television signal transmitted through wireless broadcasting, and convert the format of the wireless television signal into the standard format;

a closed circuit television signal processing subunit, configured to receive and process closed circuit television signal transmitted through wire transmission, and convert the format of the closed circuit television signal into the standard format;

an internet television signal processing subunit, configured to receive and process internet television signal transmitted through Internet, and convert the format of the internet television signal into the standard format.

As a preferable embodiment, in the split-type television, the master control module further comprises:

a local storage device, connected to the core unit;

wherein the core unit calls and transmits audio and video data stored in the local storage device to the screen terminal module for playing.

As a preferable embodiment, in the split-type television, the subunits further comprise:

an audio and video input device, configured to receive audio and video data transmitted by an external audio and video output device, and store the audio and video data into the local storage device.

As a preferable embodiment, in the split-type television, the subunits further comprise:

a wireless communication device, configured to receive and transmit network audio and video data to the core unit for processing, and the core unit transmits the processed network audio and video data to the screen terminal module for playing.

As a preferable embodiment, in the split-type television, each of the subunits and/or the core unit is independently integrated into a single structure, to be separately upgraded and/or replaced.

As a preferable embodiment, in the split-type television, the display exchanges data with the master control module through preset integrated bus.

The above technical solution has the following advantages or beneficial effects:

The technical solution of the present application separately configures the master control module and the display in the television, and the display is mainly used to play the audio and video data, and the master control module is mainly used to receive and process the audio and video data; the master control module and the display are separately configured in the physical structure, thus it allows users to carry out the operations like repair, maintenance, upgrade and replacement on them separately; at the same time, since the display (i.e., the screen terminal) is provided with the power adapter for the master control module, as long as the master control module is connected to the display, the power adapter will be able to supply power the master control module normally, thus achieving the sharing of the same power source between the master control module and the display, which are configured separately, and avoiding rising costs due to the master control module and the display separately provided with power devices, and also facilitating users to buy and place the television; and users can maintain and upgrade the television by replacing or upgrading the master control module or part of the subunits; in addition, the split-type television disclosed in the present application can upgrade each separate unit according to personalized demands, thus effectively reduce the upgrading cost of televisions.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
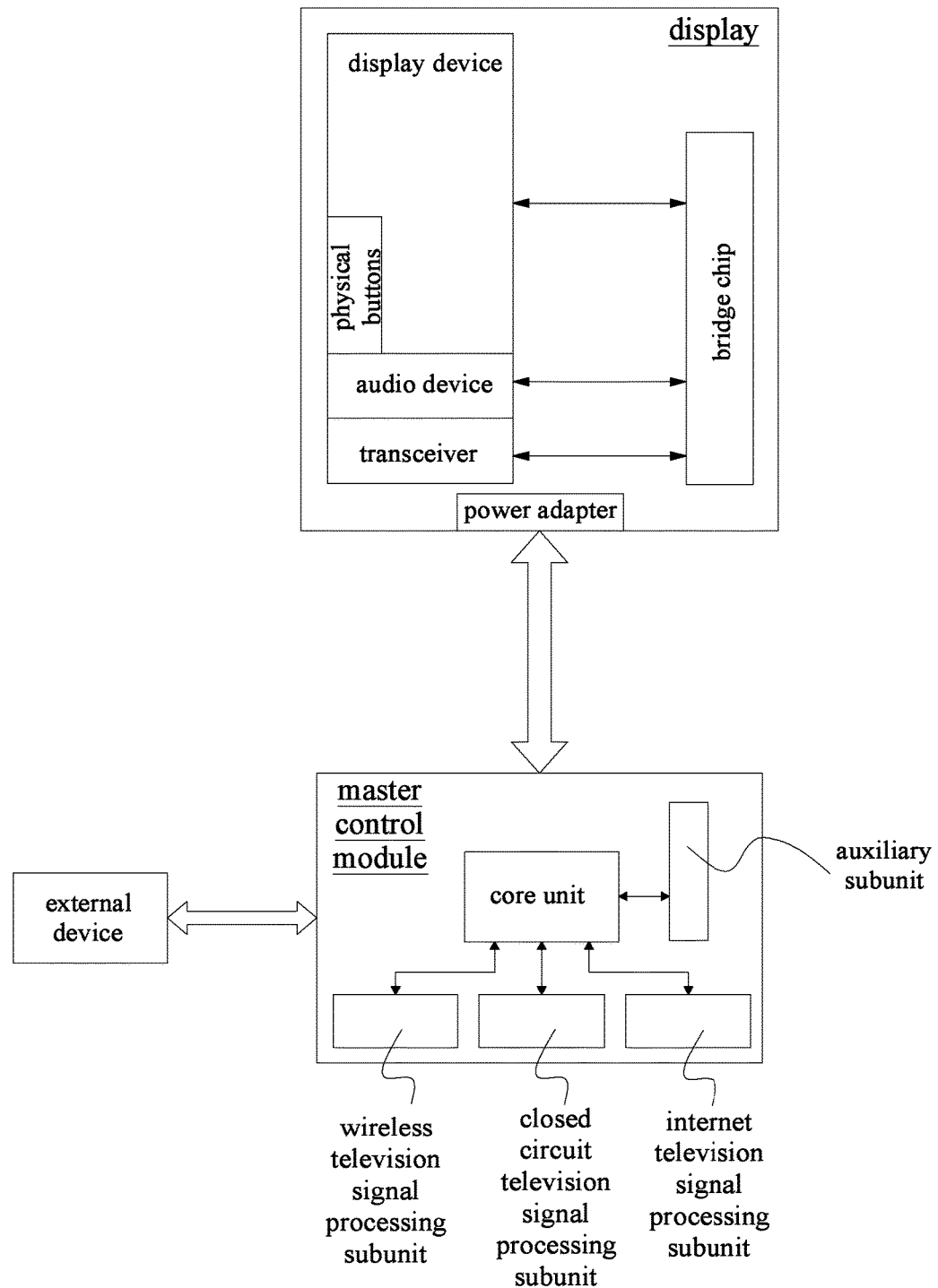
FIG. 1 is a structure diagram of the split-type television in the embodiment 1 of the present application.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The split-type television provided in the embodiment of the present invention integrates the core components in the television structure into a single independent master control module based on the prior television structure, and also the independent master control module can be made up of essential core modules in the television and at least one independently configured subunit with an independent function, and the screen terminal components used for audio and video playing are integrated into another independent display; since the upgrade speed of the components in the display is slower, and the upgrade speed of the components in the core module is faster; when upgrading the television, users can only separately upgrade the core components, which need to be upgraded, and keep the components need no upgrade like the screen terminal components, therefore it effectively reduces the upgrading cost of the television; moreover, users can configure the required subunits with independent functions with the core module to form the master control module having special functions according to individual needs when purchasing a new television, thus makes the purchased television meet individual needs.

The contents below describe the split-type television of the present invention in detail combined with the accompanying drawings and specific embodiments.

Embodiment 1

FIG. 1 is a structure diagram of the split-type television in the embodiment of the present application; as shown in FIG. 1, the split-type television of the embodiment comprises:

The master control module, assembled mainly from the core components of the television, which may comprise, such as input devices (such as HDMI/CVBS, etc.) related to the playing contents of the television, and the master control chip storing relevant information like the online video data, the application data and the game data, etc; the master control module is connected to the signal transmission device of the split-type television via the connectors configured on the display, to receive the original data (i.e., the first data) transmitted by the signal transmission device, and, after processing the original data, generate playing data (i.e., the second data) matching with the display.

Preferably, the master control module can be made up of an indispensable core unit in the television, which is assembled by, such as, the master control chip and so on, and at least one subunit, and each subunit can independently realize a processing function for data in at least one format (such as wireless television data, closed circuit television data, internet signals, etc.); when the above mentioned split-type television is assembled with any subunits, each of the subunits is connected to the signal transmission device, which matches with it, respectively, to receive the original data in the corresponding format, and converts the original data into data, which is to be processed, in a standard format, so that the core unit processes and converts the data into the playing data.

Preferably, any one of the above subunits can be separately configured together with the core unit to form the master control module which can be normally operated, and realize receiving and playing of a type of television signal via the display; of course, two or more subunits can be mixed to realize the receiving and playing of two or more types of television signals.

Preferably, the above subunits may comprise a wireless television signal processing subunit, a closed circuit television signal processing subunit and an internet television signal processing subunit; the wireless television signal processing subunit is mainly used for receiving and transmitting wireless television signals, and converting the format of the wireless television signals into the standard format, for subsequent processing by the core unit; the wireless television signal processing subunit may receive and process wireless television signals through the way of, such as, broadcasting, and it correspondingly need to be integrated with components like the receiving antenna for wireless signals and the audio and video converter, and independently realizes operations like receiving, analyzing and converting the wireless television signal data; the closed circuit television signal processing subunit is used for receiving and processing the closed circuit television signals (such as the digital television signal etc.) transmitted through wire transmission, and converts the format of the closed circuit television signals into the standard format; the closed circuit television signal processing subunit may receive and process television signals via, such as, wires, and it correspondingly needs to be integrated with components like the receiving device for closed circuit television signals and the audio and video converter etc., which separately realize operations like receiving/transmitting, analyzing and converting the closed circuit television signal data; the internet television signal processing subunit is used for receiving and processing internet television signal (such as the online audio and video data, the game data and the application data, etc) transmitted through Internet, and converts the format of the internet television signal into the standard format; the internet television signal processing subunit may receive and process television signal through Internet, which correspondingly need to be integrated with components like the receiving device for internet television signals and the audio and video converter etc., and separately realize operations like receiving/transmitting, analyzing and converting the internet television signal data.

It should be noticed that any one of the above subunits is mainly adapted to separately receive, analyze and convert the television signal when transmitting the television signals in different ways, so as to convert the original television data into the data, which is to be processed, in a unified standard format for the subsequent processes by the core unit; at the same time, each subunit may have components for data exchange according to practical needs, to achieve exchange with the television signals (such as the internet television signals) having the matching format. Further, the above mentioned core module may also comprise a plurality of auxiliary subunits which can be operated and upgraded separately and is made up of a component(s) that can independently achieve a certain function, as long as each of them can be replaced and upgraded separately.

Preferably, the above mentioned core module is also connected to the external device providing television signals to receive the original television signal, and to process and transmit the television signal to the display for playing.

Preferably, the above mentioned display can also be integrated with the power adapter for driving the master control module and providing power to the master control module via a connector, so as to realize the purpose that the master control module and the display configured separately share the same power source, and avoid cost from increasing due to configuring hardware devices related to the power adapter to the master control module and the display separately; of course, based on the purpose of sharing the same power source, the master control module may be integrated with a power adapter for providing power to the display, which can also realize the purpose of reducing costs, and also thinning the display so that facilitates users for placing and operating the purchased television.

Meanwhile, the above mentioned core unit (comprising the master control chip, etc.) can be used for processing different television signal data, and authenticating, controlling, supplying power and other operations to each subunit; as the core component of the television, it can also be upgraded and replaced separately; i.e., the above mentioned master control module is assembled from a plurality of separate unit modules, and can be replaced or upgraded as a whole, and also each unit can be replaced or upgraded as a separate component, so that it allows users to assemble different subunits with the core unit to form the core module meeting their individual needs when purchasing the television; and in the subsequent using process, different needs of users at different stages can be contented through changing, upgrading or adding the corresponding subunits.

It should be noticed that the above core module necessarily comprises the core unit and at least one subunit, and as long as it comprises the core unit and one subunit, the core module can realize the receiving, analyzing, converting and other operations of the television signal in the matching format of the subunit, and also by adding any one or more subunits and/or auxiliary subunits, the core module will have the function corresponding to the added units.

Preferably, the above mentioned core module may also be configured with, such as, an audio and video input device for receiving audio and video data transmitted by an external audio and video output device, internet access devices (such as a Wi-Fi device providing wireless communication signals and/or an Ethernet device providing wire communication signals etc.) for providing internet communication signal an so on, which allows the split-type television of the embodiment to be integrated into the rapidly developed Internet of Things interconnected with the smart home. Further, the above mentioned split-type television also comprises a display, and the display is in communication connection with the above mentioned core module through external cables (such as preset integrated bus, etc.) or via a wireless communication way; in the present embodiment, the display can be connected to the master control module through integrated bus, to achieve receiving and transmitting audio and video data and other functions, and also the display can feedback or transmit corresponding control instruction to the core module, so that users can carry out playing or human-computer interaction with the split-type television; at the same time, the display is configured separately from the core module, so that they can be upgraded and/or replaced separately, and also a same display can be connected simultaneously to one or more core modules, and a same core module can be connected simultaneously to one or more displays, thereby achieving functions like multi-screen display or multi-screen interaction.

Preferably, the above mentioned display may comprise many devices like a bridge chip, a display device (such as a liquid crystal display), an audio device (such as a sound) and peripheral devices (such as physical buttons and a remote signal receiving device) etc., wherein one or more devices are integrated on the display, i.e., the master control module can be only integrated with processing units for processing the various functional modules, and the peripheral devices of various functional modules can be integrated on the display or configured separately, as long as the bridge chip is connected with the above mentioned master control module and capable of receiving and processing the audio and video data processed by the master control chip, and also transmits the audio data to the audio device for playing, and, at the same time, transmits the video data to the display device for playing, and also synchronizes the playing progress of the display device and the audio device; the above mentioned receiving/transmitting device is mainly used for the control instructions transmitted by the remote control matched with the split-type television, and transmitting the control instructions to the master control chip, so that the master control chip controls the operation of the display device and/or the audio device according to the control instructions.

Preferably, when the above mentioned display device is a touch screen; the bridge chip may also forward the touch instruction transmitted by the display device to the core unit of the master control module, in order to achieve the interaction between users and the television.

Preferably, users can adjust the features of the display device itself such as the contrast, the quality and other parameters of image display via the physical buttons.

Preferably, the above mentioned master control module further comprises a local storage device that can be used to store the audio and video data downloaded by users and the parameter information played by the television etc.; at the same time, the display may also comprise audio/video recording devices (such as a microphone, a camera etc.), users can record corresponding user audio/video data through the audio/video recording device, and store it in the local storage device and/or a remote server for share, meanwhile the split-type television can also call and play the stored audio/video data or audio/video data shared by other users.

In the present embodiment, by separating the master chip and the screen terminal module (such as the display) of the television (i.e., configuring the master chip in the master control module), the size of the screen terminal can be reduced and the television can be upgraded through upgrading all or part of the components of the master control module under the premise of without replacing the display, and thus greatly reduce the upgrading cost of users. The contents below describe the process from purchasing to upgrading/replacing the split-type television in detail:

Firstly, a users can select corresponding display according to his/her own needs (such as size, quality, audio and video effects, etc.) when purchasing the television.

Secondly, the user selects the core unit matching with the selected display, subunits and auxiliary subunits they need, according to the selected display; and then the selected core unit, subunits and auxiliary subunits are assembled into a master control module; for example, if the user only has need on home digital television, the user can select a core unit and a closed circuit television signal processing subunit, and assemble the core unit and the closed circuit television signal processing subunit into a master control module, so that the user can only select corresponding functional subunits based only on specific needs when purchasing, thereby reduces the cost of purchase for users.

Thereafter, by inserting the master control module into the preset slot in the display to connect, a television with functions the user needs is formed; and after connecting the television to the peripheral devices matched with the television, the television signals can be played once power on.

Finally, in the process of subsequent use, if there is a new demand, the user can only purchase the master control module meeting his/her new demand, and replace with the purchased master control module into the display so as to meet their needs on the basis of the purchased split-type television; of course, the user can also remove the subunit in the master control module of the purchased split-type television according to needs, and when replacing, upgrading or repairing, the user can also separately upgrade, repair or replace one subunit, therefore greatly reduce the subsequent upgrade and maintenance costs of the television.

At the same time, since each functional module in the master control module is separately integrated, it can also improve the level of division of labor in manufacturers, to reduce production costs through a separate batch production mode, thus promoting the fast development of the entire industry; of course, based on the same concept, the structure of the display can also be configured in a similar way.

In summary, the present embodiments configures the display separately from the master control module, to effectively reduce the upgrade difficulty of the television, at the same time each functional module in the master control module is separately integrated as a whole, thereby the master control module and/or any of the functional modules can be separately replaced or upgraded, so that each functional module in the whole television structure can be separately upgraded or replaced, to effectively solve the problem of the upgrading mismatch between the components in the television structure, which reduces the upgrade and maintenance cost of the television; and the split-type television described in the application can also achieve the sharing of power source, which facilitates to thin the size of the display and place and operate the television; and also specific configuration can be made according to individual needs of different users, so as to effectively meet the individual needs of different users.

Embodiment 2

Figure 2:
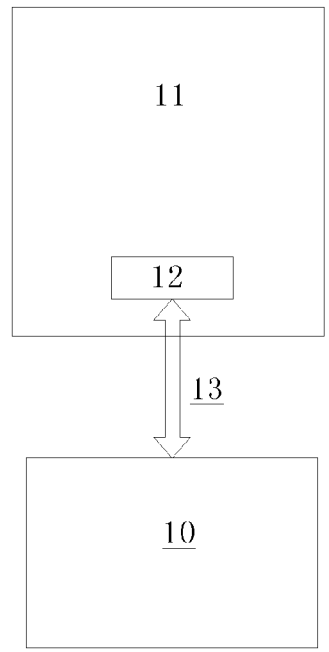
FIG. 2 is a structure diagram of the audio and video system in the embodiment 2 of the present application.

The present application also provides an audio and video system, on the basis of embodiment 1, referring to FIG. 2, the audio and video system comprises a control block 10 (equivalent to the master control module in the above-described embodiment 1) and a display panel 11, and the display panel 11 (equivalent to the display in the embodiment 1) is also embedded with a bridge interface 12 and a bridge chip (not shown). The above mentioned control block (equivalent to the master control module in the embodiment 1) 10 can be configured separately from the display panel 11 in the form of modular piece, and the control block 10 may have various form factors, and also connected to the bridge interface 12 through one or more connectors 13, to transmit the audio and video data to the bridge chip and control the above mentioned display panel 11 to play.

Figure 3:
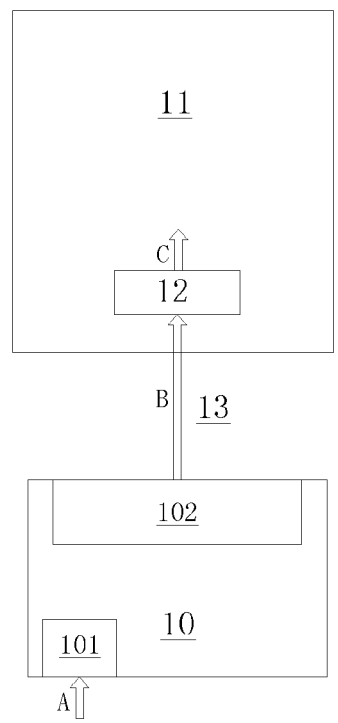
FIG. 3 is a structure diagram of the conversion of audio and video signal in the audio and video system in the embodiment 2 of the present application.

Preferably, the control block 10 may comprise controls (not shown), related hardware 102 and inputs 101 of the television etc.; if the control block 10 comprises video inputs and video processing hardware, referring to FIG. 3, when the control block 10 transmits the video data to the bridge interface 12 through the connector 13, the bridge interface 12 transmits the received video data in a B-type format to the bridge chip, so as to convert the video data in the B-type format into a displayable C-type format which can be displayed on the display panel 11, and display the converted video data through the display panel 11. Specifically, the control block 10 may comprise core modules of the television such as a central processing unit (CPU), a graphical processing unit (GPU), a television (TV) tuner, a power adapter for the control block 10 and/or the display panel 11, high-definition-multimedia-interface (HDMI) inputs and Wi-Fi modules and/or Ethernet devices etc.

Figure 4:
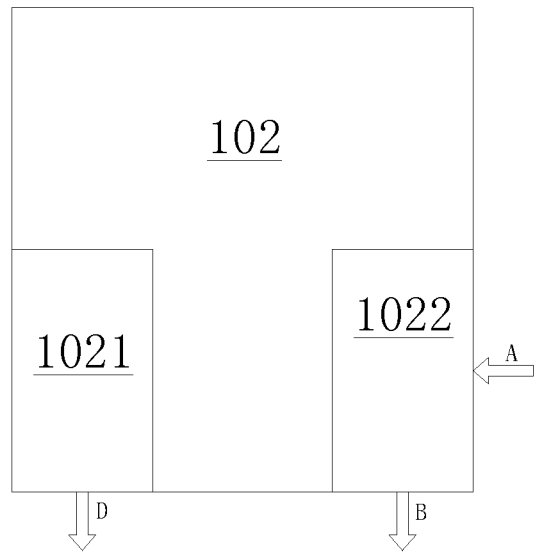
FIG. 4 is a structure diagram of the hardware devices in the audio and video system in the embodiment 2 of the present application.

Preferably, based on FIGS. 1-3, referring to FIG. 4, the above mentioned video processing hardware 102 comprises a television tuner 1022, which is mainly used for processing the television signal A received by the control block 10, i.e, tuning the television signal A into the video data in B-type format, and outputting the processed television signal to the above mentioned bridge interface 12 through one or more connectors 13.

Preferably, the above mentioned control block 10 can be connected to the display panel 11 through various ways, for example: the control block 10 may be directly mounted onto the display panel 11, or connected a short distance away to the display panel 11 using one or more cables, or exchange data with the display panel 11 via a wireless connection.

Preferably, the above mentioned bridge chip configured on the display panel 11 can adjust parameters of the display panel 11 independently, so that the same display panel 11 can match control blocks 10 with different control modes, thereby facilitating the subsequent upgrade operation, and reduce the upgrade cost.

Currently, due to social and technological progress, on the consumer electronics market, core modules of smart TV based on SOC are usually upgraded every six months, yet the progress of the TV panel technology is relatively slow, thereby unable to synchronously update with the core modules; and since the current televisions are all-in-one machines, which cannot separately upgrade the core modules. In order to enable consumers to enjoy the television brought by the latest technology with the lowest cost, the applicant invented the aforementioned audio and video system, so that users can upgrade the core modules like the video function, the hardware of the old TV and so on via purchasing or upgrading the control block 10 having a new function, i.e. The novel or newly upgraded control block 10 and the old display panel 11 are configured together into a TV with the latest technology, therefore allows users to enjoy the latest television technology with lower cost.

As an illustration of a specific embodiment, the above mentioned control block 10 can be regarded as a dongle or a plug adapter, i.e., the control block 10 can be plugged into the display panel 11 via a plug-n-play connector or wire. For example, for the plug-card TV (the split-type TV in the embodiment 1) configured based on the embodiment, the plug-card TV may comprise a TV panel and a plug card, and the plug card is plugged into the above mentioned TV panel and will achieve a normal TV function once power on; while upgrading the plug-card TV, users can only upgrade the control block or replace a control block with a new functional to complete the upgrade of the entire split-type TV; the display panel 11 is only as a monitor, which does not need to be upgraded or replaced, thereby it allows users to enjoy the most advanced television technology with very low upgrade cost, and also effectively promotes the rapid development of television technology.

Wherein in the above mentioned plug-card TV, the display panel is as the main structure in the volume of the TV, which is provided with slots on the display panel, the plug card is smaller comparing to the volume of the display panel; at the same time, the integration process integrates a plurality of core devices into a whole control block having plugs matching with the above mentioned slots, the plug card is plugged into the slot through the plug, so as to easily complete the assembling of the television; accordingly, the control block can be configured with the power source sharing with the display panel, and based on the same philosophy, the power adapter can be provided in the display panel, and the control block can be configured with sharing power source according to demands.

Meanwhile, the above mentioned split-type TV can be based on the embodiment 1, while achieving personalized assembling and separate upgrade of a plurality of integrated units, the display panel is used as the main structure of the TV, and the connection between the display panel and the control block can be achieved only via sockets; i.e., users can easily complete replacing and upgrading of the control block by a way of plug and extract, thereby reducing upgrade and maintenance costs, and also reducing the upgrade difficulty of users.

Further, as another embodiment, the above mentioned control block 10 may also be regarded as a control box, and the control box has an output in HDMI or other format, so that the control block 10 can use the output to connect to the input of the display panel 11 having a matching format with the output, i.e., the control block 10 may use the HDMI output to connect to the HDMI input in the display panel 11 through a HDMI cable (of course, other types of cable can be used to achieve the communication and/or electrical connection between the control block 10 and the display panel 11; correspondingly, the control block 10 and the display panel 11 should be provided with connection ports matching with the specification of the cable, i.e., the specification or type of the cable will not affect the implementation of the technical solutions of the present application, as long as completing the communication and/or electrical connection between the control block 10 and the display panel 11). For example, the box controlled TV structured based on the embodiment (i.e. the split-type TV in the embodiment 1), the box controlled TV is provided with a plurality of separate modular structures, such as a control box and a TV panel, and the TV panel is connected to the control box through a customized cable, and also each module can be upgraded independently, thereby it is convenient for upgrading or replacing the sub-systems of the television like the audio etc.

Wherein, based on FIGS. 1-3, referring to FIG. 4, the above mentioned hardware 102 of the control block 10 of the box controlled TV also comprises a power adapter 1021, and the power adapter 1021 outputs an electrical signal D (the power adapter 1021 can also be configured in the screen terminal device such as the TV panel according to the specific needs, as long as it can achieve the purpose of sharing the same power source), to power the TV panel through a connector; i.e., the control block and the TV panel share the same power source, so that the they no longer need to be provided with power lines separately, therefore reduce the production cost of the TV, and also save the space occupied by the TV, and the structure of the TV is more simple and beautiful.

Meanwhile, the above mentioned box controlled TV may also be based on the embodiment 1, while achieving the personalized assembling and separate upgrade of various integrated units, the control box is made as the main structure of the television, and the control box powers the TV panel through the cable, thus reducing the upgrade and maintenance costs and effectively reducing the size of the TV panel, so that the box controlled TV will have a nice light-weight performance.

It should be noted that in the plug-card TV and the box controlled TV, the display panel and the TV panel are essentially the same, the only difference lies on the corresponding and adaptively changes of the package pins of the connection port based on the different PCB board layout, which can be achieved interoperability between each other. Between the control block and the control box, the same main chip may be used to support video decoder and multimedia functions.

Embodiment 3

Based on the embodiments 1 and/or 2, the present application also provides an audio and video interface conversion device available to the television systems like the split-type TV and the box controlled TV, i.e., the audio and video interface conversion device can be applied to the display panel and the TV panel of the embodiment 1 and embodiment 2; however, connection modes between the control block and the display panel of different types of television are different, in the practical application, the audio and video interface conversion device can be adaptively adjusted based on the actual situation, while the main principle and structure thereof are applicable to each other.

The audio and video interface conversion device of the present embodiment may be a bridge IC (bridge chip), for example a high-performance single-chip may be provided as the bridge IC, as long as it can convert the HDMI format data into the LVDS and/or V-by-One format data; for example, the bridge IC may have an embedded 32 bit RISC processor for system control, and be integrated with an embedded HDMI receiver and a LVDS/V-by-One transmitter, i.e., the bridge IC supports HDMI 2.0 input, and converts the input data into the LVDS/V-by-One format data to output; the above mentioned embedded HDMI receiver fully supports the HDMI 2.0 specification, and can receive audio and video signals through the input on the display panel.

Preferably, the HDMI 2.0 interfaces in the above mentioned bridge IC can be extended, so that the bridge IC can support the resolution more than, for example, 4K×2K×8 bit 4:4:4 60 Hz or even higher; thus the bridge IC may have a more matching resolution (like the 4K×2K×10 bit 4:4:4 60 Hz resolution) with the native resolution of the screen terminal, to achieve the best image quality. Preferably, the bridge IC further comprises a video processing unit and an audio processing unit, and the video processing unit can not only perform advanced image correction and enhancements, but also can convert the format of the processed data into the LVDS/V-by-One format to output.

Preferably, the above mentioned bridge IC is further integrated with a LVDS transmitter and a V-by-One transmitter, the LVDS transmitter transmits data in the resolution lower than 1080P@60 fps, and supports single-link and double-link LVDS output, and the V-by-One transmitter supports the data output in 2K/4K@60 fps resolution.

Preferably, the above mentioned bridge IC of the embodiment is further integrated with a plurality of advanced peripherals, such as an IR remote receiver, a 2-channel ADC device, a 12C device, an UART device, a SPI device and a PWM interface and so on.

Further, the above mentioned bridge IC is further integrated with an on-chip oscillator and a 64 KB SRAM to effectively simplify the system and reduce system complexity and BOM cost.

In the present embodiment, the bridge IC is high performance and cost-effective, and has the function of converting the received HDMI data into LVDS/V-by-One format data, so that it can be applied in HD TV, FHD TV, UHD TV and other devices.

Figure 5:
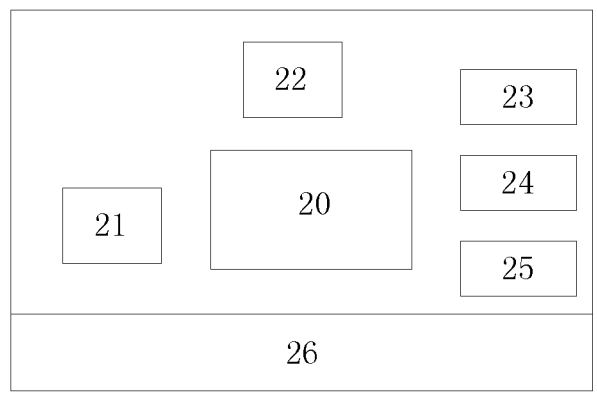
FIG. 5 is a structure diagram of the bridge IC in the audio and video interface conversion device in the embodiment 3 of the present application.

FIG. 5 is a structure diagram of the bridge IC in the audio and video interface conversion device in the embodiment 3 of the present application; as shown in FIG. 5, the bridge IC comprises a core and fabric module 20, an audio/video input unit 21, a video output unit 22, an audio output unit 23, a memory interface 24, a system interface 25, and an input/output unit 26.

Further, the above mentioned core and fabric module (equivalent to the core device in the embodiment 1) 20 may comprise a plurality of sub-systems such as an embedded 32-bit RISC processor, and also video processing units and storage units for independently storing data (such as 64 KB SRAM), ICCM, DCCM and other units, and the core and fabric module 20 also supports the fast computation and extended arithmetic package and so on of MAC operations.

Preferably, the video processing unit has a pattern generator, an OSD, a DNLP, a white balance, a Gamma, a Hue saturation adjust, a bight contrast and other functional modules, and the pattern generator can generate gray scale colored light of a variety of standard like red, green, blue, white and black.

Preferably, the audio/video input unit 21 has an embedded HDMI 2.0 Rx interface for receiving HDMI format television signals, and the supported resolution of the audio/video input unit 21 is 1080P@60 Hz, 1080P@120 Hz, 1080P@50 Hz, 1080P@100 Hz, 1366*768@50 Hz, 1366*768@60 Hz or 4K*2K@60 Hz, etc; accordingly, the video output unit 22 has a LVDS port and a V-by-One port, the LVDS port is a 1 or 2 channel and supports the resolution of 1080P@60 Hz, 1080P@50 Hz, 1080P@100 Hz, 1366*768@50 Hz or 1366*768@60 Hz, etc., while the V-by-One port supports the resolution of 1080P@60 Hz, 1080P@120 Hz, 1080P@50 Hz, 1080P@100 Hz, 1366*768@50 Hz, 1366*768@60 Hz or 4K*2K@60 Hz, etc.

Preferably, the above mentioned audio output unit 23 has a 2-channel 12S port, while the memory interface 24 has a SPR NOR and a flash controller, and supports 1-bit, 2-bit or 4-bit flash via the SPI interface; the system interface 25 has PLLs, an internal OSC and a PMU, etc. the input/output unit 26 has an IR remote, two embedded SA RADC sub ports, two 12C sub ports, three UART sub ports, a SPI sub port, four PWM sub ports and a set of common I/O interfaces. Wherein, in the four PWM sub ports, one of PWM sub port is used for LED output, the remaining three PWM sub ports are used for video output.

Further, the above mentioned bridge IC is also integrated with peripherals like input ports for common counters, timers, internal oscillators and 24 MHz crystal oscillators etc., and the bridge IC further has two internal power management modules controlled by software and so on.

Preferably, the audio and video interface conversion device of the present embodiment can be configured with pins of a specification of 13*13 for port connection, and specifically each pin can be adaptively configured in accordance with the actual needs based on existing standards, and part of the pins can be configured as all-purpose pins, so as to be adapted to televisions assembled in different ways.

In summary, the present application separately configures the display and the master control module, and a plurality of function modules in the master control module are integrated as a whole, so that the master control module and/or any of the function modules can be separately replaced or upgraded, thereby each function module in the whole television structure can be separately upgraded or replaced, to effectively solve the problem of the upgrading mismatch between the components in the television structure, and reduce the upgrade and maintenance cost of the television; and the split-type television user described in the application can easily and timely upgrade the entire television with a low cost only by replacing or upgrading the master control module, thus allows users enjoy the most advanced television technology with the lowest cost.

While the present disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A split-type television, comprising:
   a master control module, connected to a signal transmission device of the split-type television to receive first data transmitted by the signal transmission device, and, after processing the first data, converting the processed first data into second data;
   at least one connector; and
   a display, connected to the master control module through at least one of the connectors, and configured to receive the second data, and play audio and video signals contained in the second data;
   wherein the master control module and the display are configured separately, the display is provided with a power adapter, and the power adapter drives the master control module through the connectors,
   the master control module comprising:
   at least one subunit, each subunit being connected to a matching signal transmission device;
   a core unit, each subunit being connected to the display through the core unit,
   wherein any of the subunits receives the first data from the matching signal transmission device, and converts the first data into unprocessed data in a standard format to the core unit, and wherein the core unit processes and converts the unprocessed data in a standard format into the second data,
   wherein any one of the subunits can be separately configured together with the core unit to form the master control module which can be normally operated, the core unit can be used for processing different television signal data, and authenticating, controlling, and supplying power to each subunit, as a core component of the television, the core unit can also be upgraded and replaced separately by inserting the master control module into a preset slot in the display to connect, and wherein each of the subunits and the core unit is independently integrated into a single structure, to be separately upgraded or replaced, and
   wherein the subunits comprise:
   a wireless television signal processing subunit configured to receive and process a wireless television signal transmitted through wireless broadcasting and convert the format of the wireless television signal into the standard format;
   a closed circuit television signal processing subunit configured to receive and process a closed circuit television signal transmitted through wire transmission and convert the format of the closed circuit television signal into the standard format;
   an internet television signal processing subunit configured to receive and process an internet television signal transmitted through an Internet and convert the format of the internet television signal into the standard format, and
   wherein the master control module further comprises:
   a local storage device connected to the core unit,
   wherein the core unit calls and transmits audio and video data stored in the local storage device to a screen terminal module for playing.

2. The split-type television according to claim 1, wherein the audio and video signal comprises audio data and/or video data, the display comprises:
   a bridge chip, receiving the second data and, after processing the second data, outputting the audio data and/or the video data for playing.

3. The split-type television according to claim 2, wherein the display further comprises:
   a display device, connected to the bridge chip to receive and play the video data.

4. The split-type television according to claim 3, wherein the display further comprises:
   an audio device, connected to the bridge chip to receive and play the audio data.

5. The split-type television according to claim 4, wherein the display further comprises:
   a plurality of peripheral devices, all connected to the bridge chip to adjust operating parameters of the audio device and the display device, and receive remote-control signal transmitted by a remote control matching with the split-type television.

6. The split-type television according to claim 5, wherein the peripheral devices comprise:
   a physical button, connected to the bridge chip to adjust the operating parameters of the audio device and the display device;

a remote-control signal receiving device, connected to the bridge chip to receive the remote-control signals, to control playing of the audio data and/or the video data.

7. The split-type television according to claim 1, wherein the subunits further comprise:
   an audio and video input device, configured to receive audio and video data transmitted by an external audio and video output device, and store the audio and video data into the local storage device.

8. The split-type television according to claim 1, wherein the subunits further comprise:
   a wireless communication device configured to receive and transmit network audio and video data to the core unit for processing, and wherein the core unit transmits the processed network audio and video data to the screen terminal module for playing.

9. The split-type television according to claim 1, wherein the display exchanges data with the master control module through a preset integrated bus.

* * * * *